(12) United States Patent
Maenishi

(10) Patent No.: US 6,893,001 B2
(45) Date of Patent: May 17, 2005

(54) GATE VALVE APPARATUS

(75) Inventor: Tamotsu Maenishi, Osaka (JP)

(73) Assignee: Waterworks Technology Development Organization Co., Ltd., Osaka (JP)

(*) Notice: Subject to any disclaimer, the term of this patent is extended or adjusted under 35 U.S.C. 154(b) by 65 days.

(21) Appl. No.: 10/444,003

(22) Filed: May 22, 2003

(65) Prior Publication Data

US 2003/0222237 A1 Dec. 4, 2003

(30) Foreign Application Priority Data

May 31, 2002 (JP) ...................................... 2002-159019

(51) Int. Cl.[7] .............................................. F16K 31/00
(52) U.S. Cl. ...................................... 251/193; 251/326
(58) Field of Search .............................. 251/193, 203, 251/204, 326

(56) References Cited

U.S. PATENT DOCUMENTS

| | | | |
|---|---|---|---|
| 2,793,831 A | * 5/1957 | Doster | 251/197 |
| 2,906,491 A | * 9/1959 | Young | 251/167 |
| 3,387,818 A | 6/1968 | Siepmann | |
| 6,283,446 B1 | * 9/2001 | Sato et al. | 251/193 |

FOREIGN PATENT DOCUMENTS

| | | | |
|---|---|---|---|
| DE | GB 779451 A | 7/1957 | |
| DE | 10 79 409 B | 4/1960 | |
| DE | 11 03 095 B | 3/1961 | |
| DE | 12 66 079 B | 4/1968 | |
| JP | 64-3909 | 2/1989 | |
| JP | 7-260015 | 10/1995 | |

* cited by examiner

*Primary Examiner*—Edward K. Look
*Assistant Examiner*—John K. Fristoe, Jr.
(74) *Attorney, Agent, or Firm*—Knobbe Martens Olson & Bear, LLP

(57) ABSTRACT

A gate valve apparatus comprising an elastic seal member inserted into a pipe, a pressure member for elastically deforming the elastic seal member under pressure, a drive shaft for moving the pressure member along the direction of insertion, a movable member for keeping the elastic seal member in pressure contact with the inner wall surface of the pipe, and a support member for supporting the elastic seal member. The elastic seal member is elastically deformed and kept in close contact with the inner wall surface of the pipe thereby to gate the flow path in the pipe. The elastic seal member includes a through hole which is formed nearer to the forward end portion along the direction of insertion than the guide hole of the support member and by way of which the forward end portion of the drive shaft can be inserted. With the movement of the pressure member along the direction of insertion, the first inclined portion and the second inclined portion act to bring the elastic seal member into pressure contact with the inner wall surface of the pipe.

7 Claims, 8 Drawing Sheets

FIG·2

FIG·4
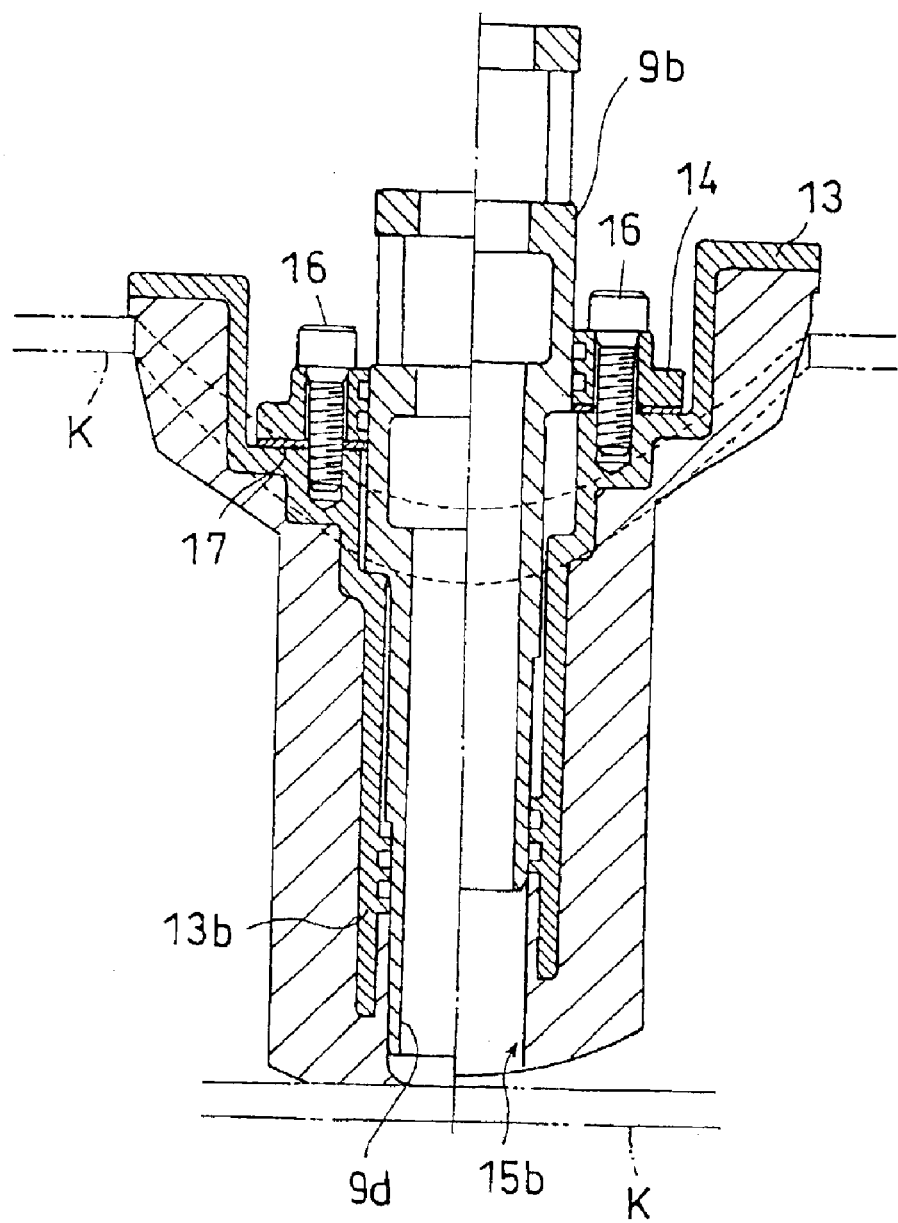

FIG·5
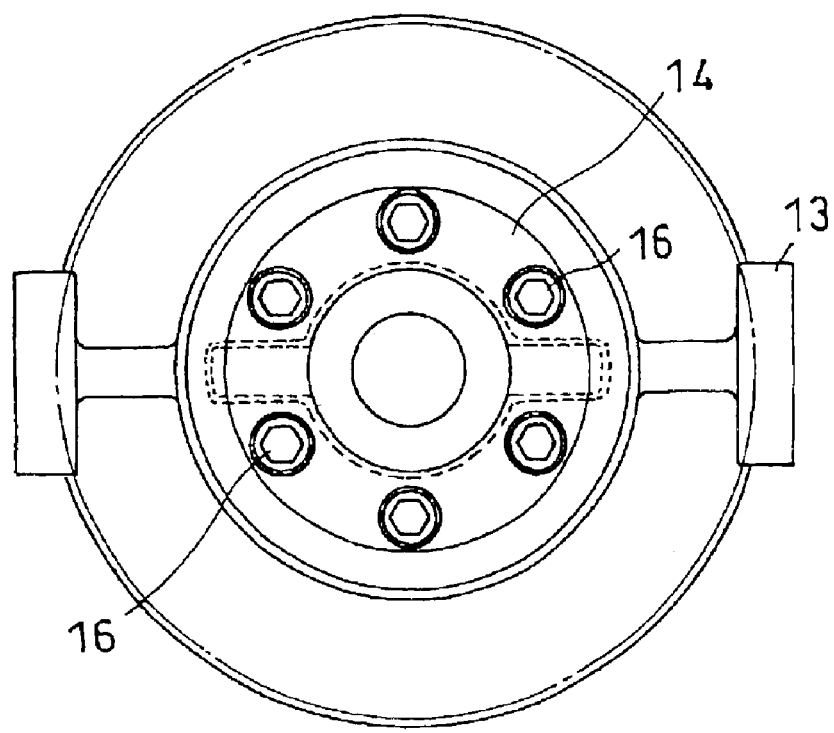

(a)

(b)

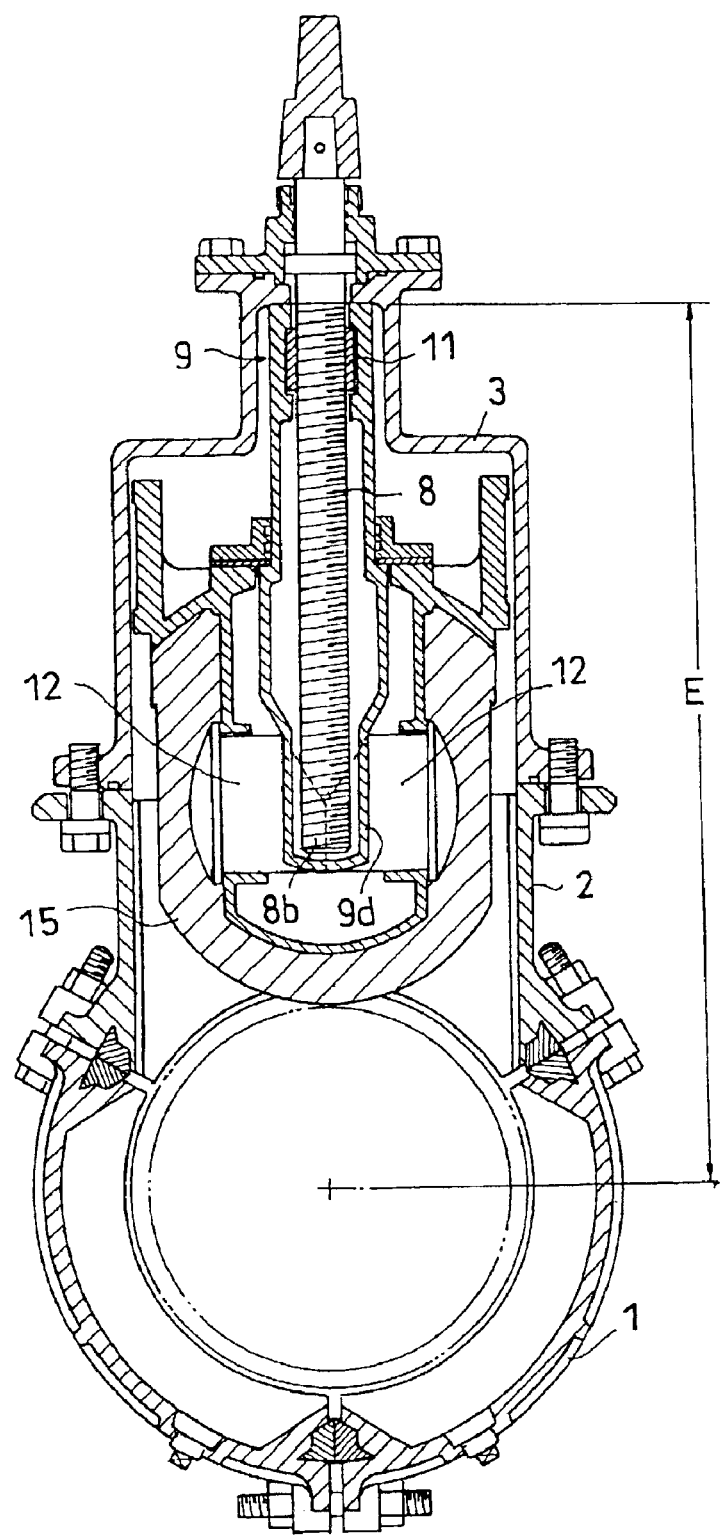
FIG·8 (PRIOR ART)

GATE VALVE APPARATUS

BACKGROUND OF THE INVENTION

1. Field of the Invention

The present invention relates to a gate valve apparatus, or in particular to a gate valve apparatus comprising an elastic seal member inserted into a pipe by way of a through hole formed in the peripheral wall of the pipe, a pressure member for elastically deforming the elastic seal member inserted in the pipe, by pressing it from the direction of insertion, a drive shaft formed in the shape of a rod along the direction of insertion to move the pressure member along the direction of insertion, and a movable member for pressing the elastic seal member into contact with the inner wall surface of the pipe in the direction crossing the direction of insertion, wherein the elastic seal member is kept in close contact with the inner wall surface of the pipe by the elastic deformation of the elastic seal member and a support member supporting the elastic seal member thereby to gate the internal flow path of the pipe.

2. Description of the Related Art

A valve body for suspending water supply in the pipe as disclosed in Japanese examined Utility Model Publication No. sho 64-3909, for example, is known as a gate valve apparatus described above. This apparatus is used for reducing the water supply-suspended area as far as possible at the time of repairing the various pipes including the water pipe.

First, a through hole is formed in the peripheral wall of an upper part of the pipe. The gate valve is fixedly inserted into the pipe by way of the through hole thereby to suspend the water flow in the pipe.

Specifically, the elastic seal member is inserted into the pipe by way of the through hole. At the time point when the lower surface of the elastic seal member comes into contact with the inner wall of the pipe, a gap exists between each the left and right sides of the elastic seal member and the inner wall surface of the pipe. This is by reason of the fact that the size of the through hole formed in the inner wall surface of the pipe is required to be smaller than the diameter of the inner wall surface of the pipe. After inserting the elastic seal member to the lowest position, the elastic seal member is brought into pressure contact with the inner wall surface of the pipe in the direction crossing the direction of insertion thereof through a movable member by the action of a pressure member. As a result, the elastic seal member can be kept in close contact with the whole periphery of the inner wall surface of the pipe.

For inserting the gate valve, a gate valve apparatus is required to be mounted on the pipe. The members making up the gate valve apparatus including the elastic seal member, the pressure member and the movable member are arranged in a case member, and the gate valve apparatus can be mounted on the pipe through the case member. Normally, before inserting the gate valve, each member is set at the upper part of the pipe. Specifically, a space for accommodating the members including the elastic seal member is required in the upper part of the pipe. As a result, the size of the gate valve apparatus is determined taking the process of mounting it on the pipe and the space for accommodating the members into account. Thus, a space extending in vertical direction is required.

The object of this invention is to reduce the vertical size of the gate valve apparatus as compared with the prior art. In view of this, the present inventors have discovered that the vertical size of the gate valve apparatus can be reduced by utilizing the space as effectively as possible in the setting immediately before insertion of the gate valve configured of the elastic seal member, etc.

SUMMARY OF THE INVENTION

The object of the present invention is to provide a gate valve apparatus in which the vertical size can be reduced as compared with the prior art.

In order to achieve the aforementioned object, according to the invention, there is provided a gate valve apparatus comprising:

an elastic seal member inserted into a pipe by way of a through hole formed in the peripheral wall of the pipe;

a pressure member for elastically deforming, under the pressure imparted along the direction of insertion, the elastic seal member inserted into the pipe;

a drive shaft formed in the shape of a rod along the direction of insertion to move the pressure member along the direction of insertion;

a movable member for keeping the elastic seal member in pressure contact with the inner wall surface of the pipe in the direction crossing the direction of insertion; and a support member for supporting the elastic seal member;

wherein the elastic seal member is elastically deformed and kept in close contact with the inner wall surface of the pipe thereby to gate the flow path in the pipe;

wherein the pressure member includes a first inclined portion for changing the direction of pressure and a guide cylinder portion formed at a position nearer to the forward end than the first inclined portion along the direction of insertion;

wherein the movable member has a second inclined portion for receiving the pressure from the first inclined portion;

wherein the support member has a guide hole fitted with the guide cylinder portion;

wherein the elastic seal member includes a through hole which is formed nearer to the forward end than the guide hole portion along the direction of insertion and by way of which the forward end portion of the drive shaft can be inserted; and wherein the pressure member moves along the direction of insertion and thereby causes the elastic seal member to come into pressure contact with the inner wall surface of the pipe by the action of the first inclined portion and the second inclined portion.

This configuration leads to the functions and effects of the gate valve apparatus as described below.

The gate valve including the elastic seal member is inserted into the pipe by way of the through hole formed in the inner wall of the pipe. After that, the pressure member is moved along the direction of insertion by the drive shaft. As a result, the first inclined portion of the pressure member and the second inclined portion of the movable member act to move the movable member in the direction crossing the direction of insertion. In other words, the direction of pressure application can be changed by the first and second inclined portions, thereby making it possible to move the movable member in the direction crossing the direction of insertion. Thus, the elastic seal member is elastically deformed and can be kept in close contact with the inner wall surface of the pipe also in the direction crossing the direction of insertion.

The support member for supporting the elastic seal member is formed of a through hole, into which the forward end portion of the drive shaft can be inserted. The vertical length of the apparatus can thus be shortened by the length of the forward end portion of the drive shaft inserted into the through hole. As a result, a gate valve apparatus is provided in which the vertical size can be reduced as compared with the prior art.

According to a preferred embodiment of the invention, the forward end portion of the drive shaft is set in a state inserted into the through hole immediately before the elastic seal member is inserted into the pipe.

By employing this configuration, the vertical size of the apparatus can be efficiently reduced.

According to another preferred embodiment of the invention, the first inclined portion and the guide cylinder portion are formed integrally with each other.

With this configuration, the number of the parts can be reduced thereby to simplify the structure.

According to still another preferred embodiment of the invention, the support member is formed of a first accommodation recess having a first accommodation sectional area and a second accommodation recess having a second accommodation sectional area smaller than the first accommodation sectional area, wherein the first accommodation recess is formed above the second accommodation recess.

The second accommodation recess functions as an accommodation space for accommodating the first inclined portion of the pressure member, and the first accommodation recess functions as a space for accommodating a restriction member for limiting the upward movement of the first inclined portion, wherein the restriction member is mounted on the surface of the step formed in the boundary between the first accommodation recess and the second accommodation recess.

With this configuration, the provision of the restriction member limits the upward movement of the first inclined portion of the pressure member (i.e. the pressure member). Also, the restriction member is mounted on the support member by utilizing the accommodation space formed as the first accommodation recess in the support member. As a result, the mounting position of the restriction member can be reduced downward, thereby contributing to the reduction in the height of the gate valve apparatus.

BRIEF DESCRIPTION OF THE DRAWINGS

FIG. 4 is a sectional view taken in line A—A in FIG. 3.

FIG. 5 is a view (plan view) taken along arrow B in FIG. 3.

FIG. 8 is a sectional view showing a configuration of a gate valve apparatus having the conventional structure.

DESCRIPTION OF THE PREFERRED EMBODIMENTS

Figure 1:
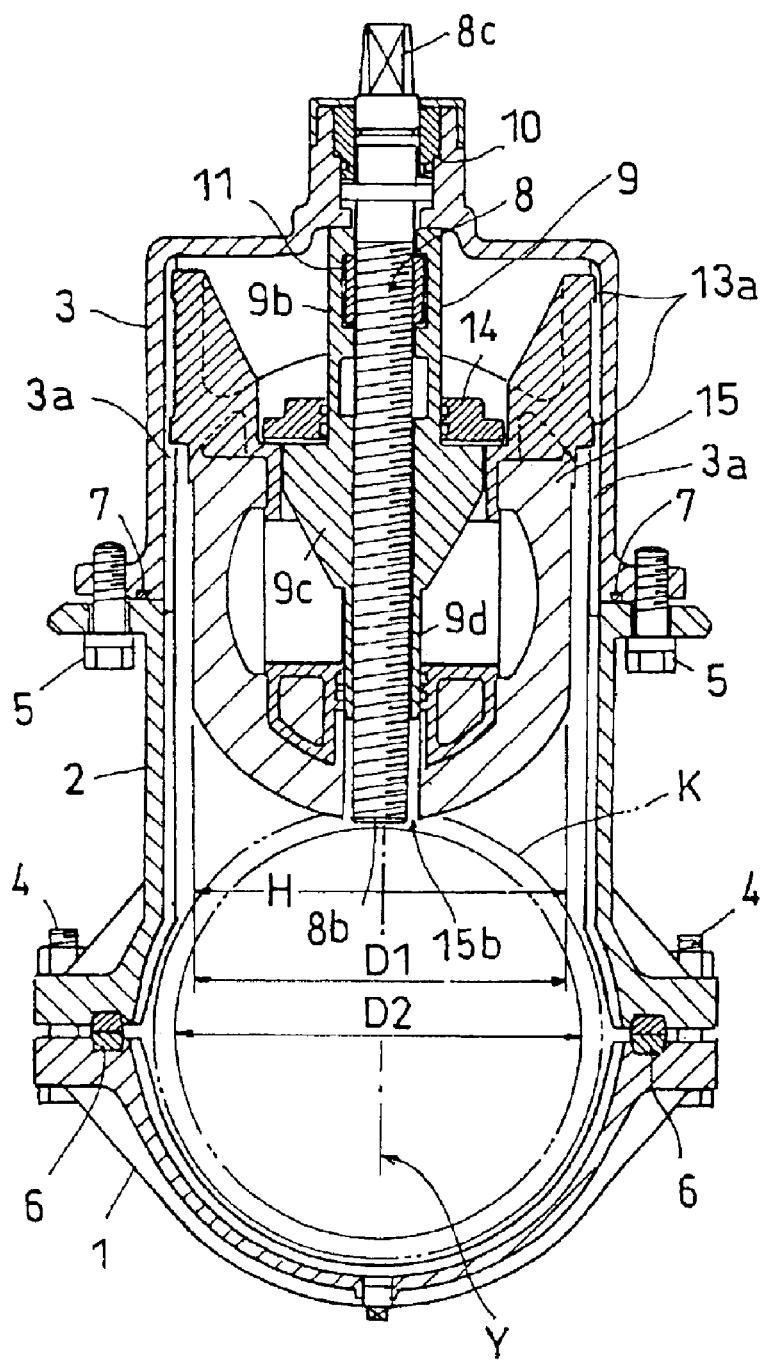
FIG. 1 is a sectional view showing a configuration of a gate valve apparatus according to an embodiment of the invention.
Figure 2:
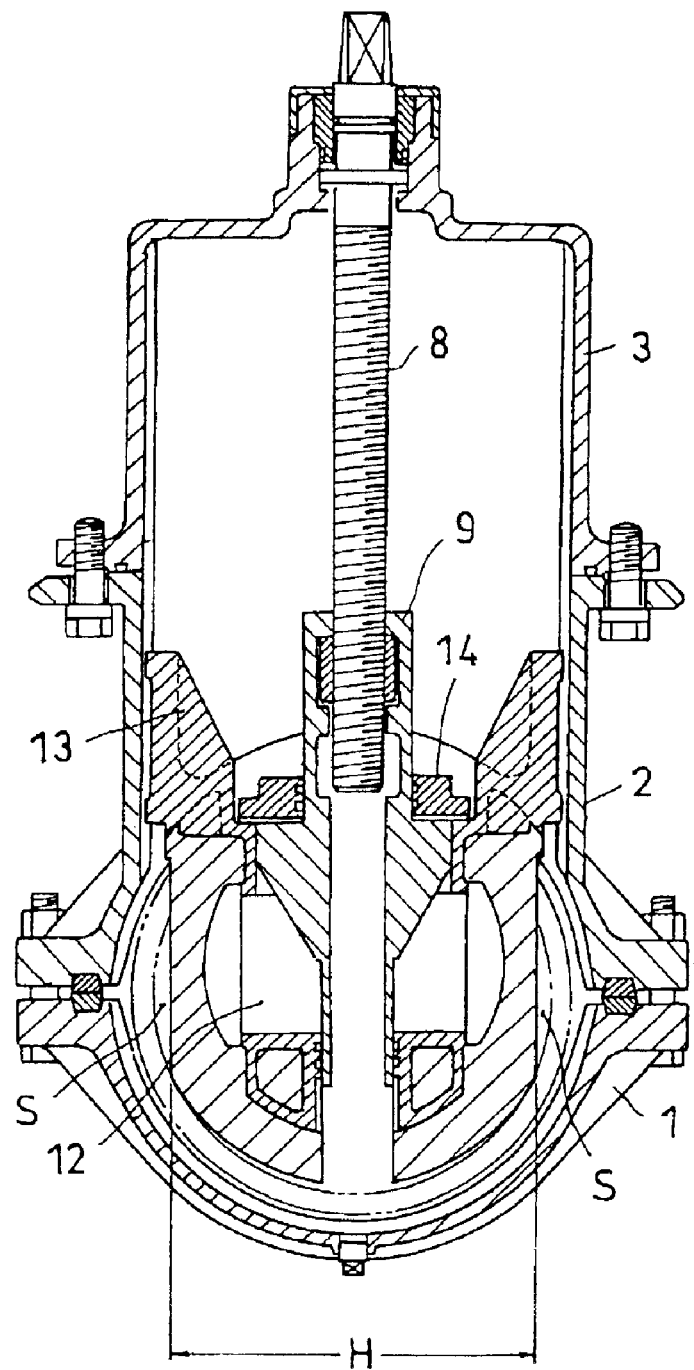
FIG. 2 is a sectional view showing a gate valve apparatus with a gate valve inserted into the pipe.
Figure 3:
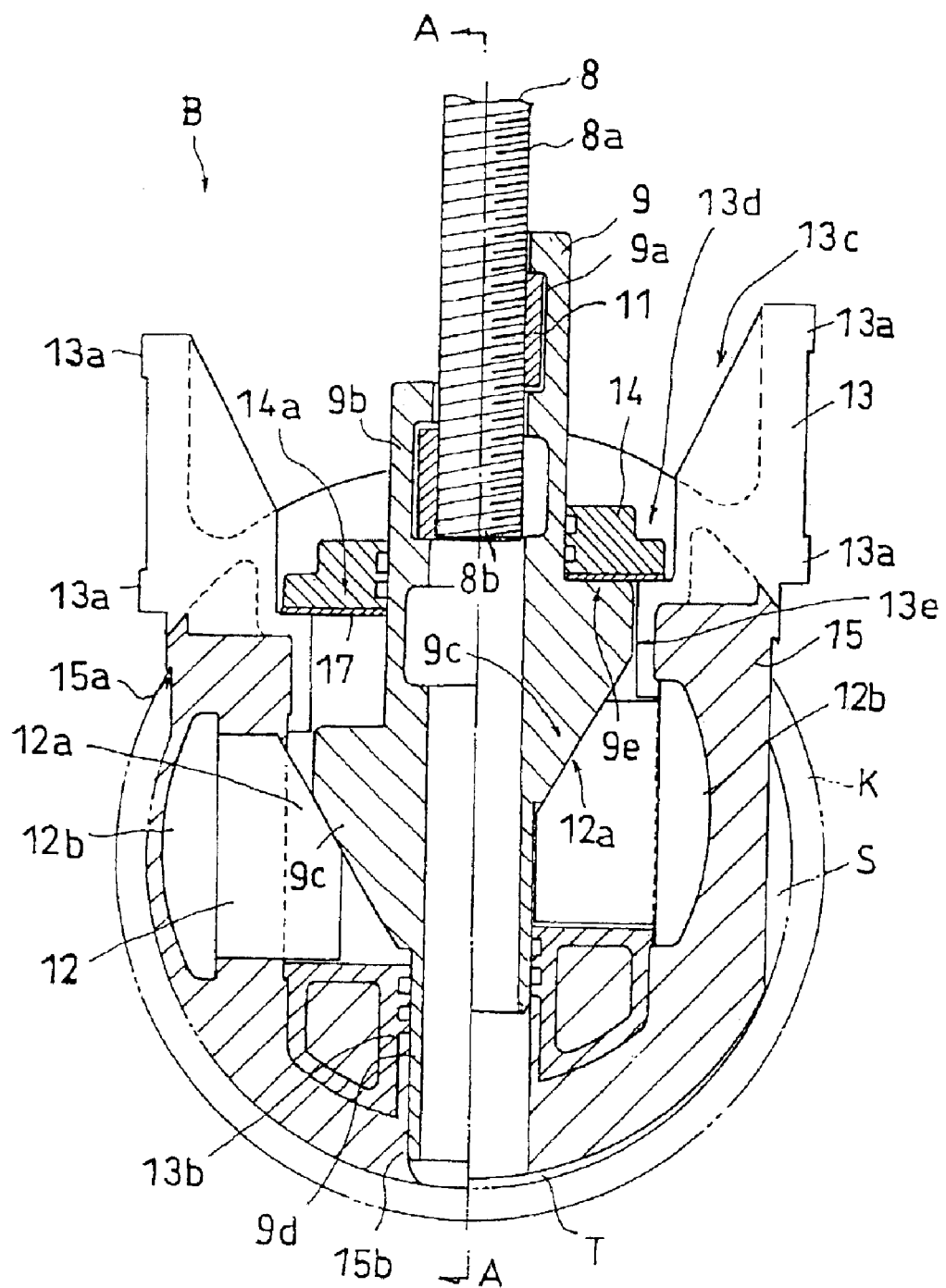
FIG. 3 is a sectional view showing the elastic seal member elastically deformed.

A gate valve apparatus according to a preferred embodiment of the invention will be explained with reference to the accompanying drawings. FIG. 1 is a sectional view showing a configuration of the gate valve apparatus, FIG. 2 is a sectional view showing the gate valve inserted in the pipe, FIG. 3 is a sectional view showing an elastic seal member in an elastically deformed state, FIG. 4 is a sectional view taken in line A—A in FIG. 3, FIG. 5 is a view taken along arrow B in FIG. 3, FIG. 6 is a diagram showing the shape of a slide spindle, and FIG. 7 is a diagram showing the shape of a movable piece.

The gate valve body in a set state immediately before being inserted into the pipe is shown in FIG. 1, in which a water pipe K is drawn in an imaginary line. In order to fix the gate valve apparatus on the water pipe K, a lower case member 1 and an intermediate case member 2 are mounted by bolt-nut mechanisms 4 around the water pipe K. The intermediate case member 2 and the upper case member 3 are mounted by a bolt-nut mechanism 5. A packing 6 is inserted between the lower case member 1 and the intermediate case member 2, and a packing 7 between the intermediate case member 2 and the upper case member 3, so that the interior is kept in a hermetically sealed state.

A gate valve body is arranged in the space defined by the case members 1, 2 and 3 described above. The configuration of the gate valve body will be explained. The vertical direction corresponds to the direction Y of insertion of the gate valve body. A valve rod 8 (corresponding to the drive shaft) extends along the direction Y of insertion. A male screw 8a is formed on the outer periphery of the valve rod 8. The forward end surface 8b along the direction of insertion of the valve rod 8, as shown in FIG. 1, is set at a position slightly outside of a virtual inner wall surface of the water pipe K. The upper end portion 8c of the valve rod 8 is connected with a drive unit not shown. As a result, the valve rod 8 can rotate about the axis thereof. The upper portion of the valve rod 8 is supported and mounted on the upper case member 3 through a thrust bushing 10.

A slide spindle 9 (corresponding to the pressure member) is arranged around the male screw 8a of the valve rod 8. The slide spindle 9 is formed with a threaded piece accommodation portion 9a for accommodating a threaded piece 11. The threaded piece 11 is formed with a female screw adapted to engage the male screw 8a of the valve rod 8. With the rotation of the valve rod 8, therefore, the threaded piece 11 moves vertically. The slide spindle 9 also moves vertically in operatively interlocked relation with the vertical movement of the threaded piece 11.

Figure 6A:
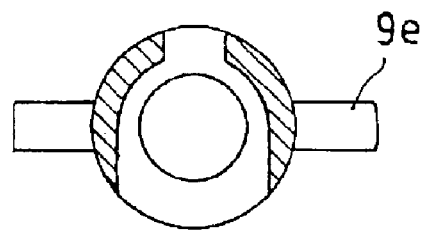
FIG. 6 is a diagram showing the shape of a slide spindle.
Figure 6B:
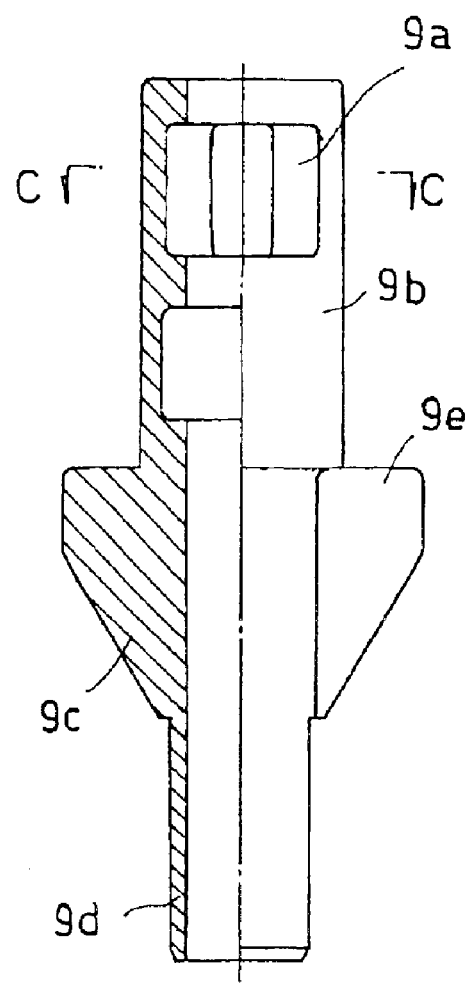
Figure 6C:
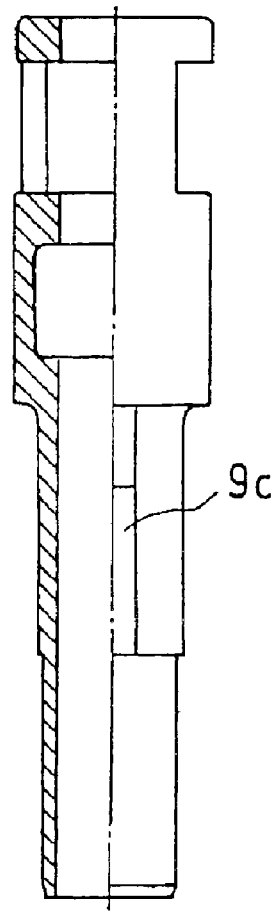
Figure 7:
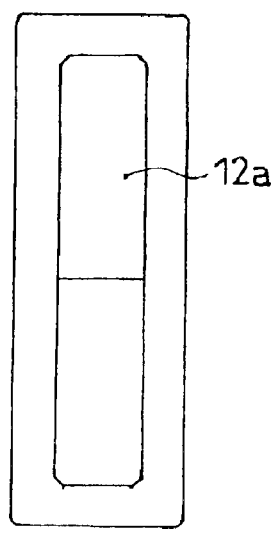
FIG. 7 is a diagram showing the shape of a movable piece.
Figure 7:
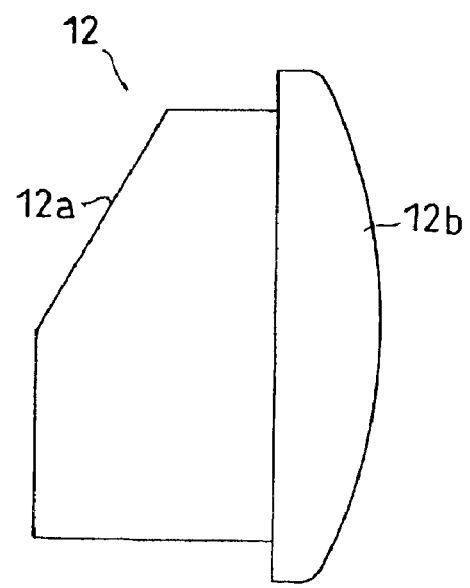

FIG. 6 is a diagram (half-sectional view) showing the shape of the slide spindle 9. Assume that FIG. 6(b) is a front view, and FIG. 6(c) a right side view. FIG. 6(a) is a sectional view taken in line C—C in FIG. 6(b).

The slide spindle 9 has a first guide cylinder portion 9b, a first inclined portion 9c and a second guide cylinder portion 9d formed integrally with each other in that order along the direction of insertion. The first inclined portion 9c, as described later, is in contact with the second inclined portion 12a formed on the movable piece (corresponding to the movable member) 12. The first inclined portion 9c and the second inclined portion 12a are formed at an angle of 30 degrees to the direction of insertion. Nevertheless, the angle can of course be set appropriately taking the operating ease, etc. into consideration. The interior of the slide spindle 9 is formed with a through hole to allow the drive shaft 8 to be inserted.

As seen from FIG. 3, the first inclined portion 9c, which has a larger outer diameter than the first guide cylinder portion 9b and the second guide cylinder portion 9d of the slide spindle 9, is formed in the shape of a wing having a substantially trapezoidal section.

A valve core metal 13 (corresponding to the support member) is lined with rubber which functions as an elastic seal member 15. As shown in FIG. 1, the elastic seal member 15 has a width H slightly smaller than the diameter D1 of the through hole formed in the peripheral wall of the water pipe K. As a result, the elastic seal member 15 can be smoothly inserted into the pipe.

It is easily understood from FIG. 3 that the elastic seal member 15 is formed with an engaging recess 15a adapted to engage the end surface portion of the through hole formed in the water pipe K. As a result, the surrounding portion of the through hole can be hermetically sealed. The lowest surface of the elastic seal member 15 is formed with a through hole 15b. The provision of the through hole 15b allows the forward end surface 8b of the valve rod 8 and the second guide cylinder portion 9d of the slide spindle 9 to enter the internal space of the through hole 15b.

The diameter D1 of the through hole, as shown in FIG. 1, is set to a value smaller than the inner diameter D2 of the water pipe K.

The valve core metal 13 is formed integrally with guide portions 13a. The guide portions 13a are adapted to fit on the guide protrusion 3a formed on the upper case member 3. Therefore, the guide mechanism permits the valve core metal 13 to move vertically without undue rotation. The slide spindle 9, the movable piece 12 and the elastic seal member 15 can also move vertically with the valve core metal 13 without rotating unduly.

The valve core metal 13 is integrally fastened with a holding plate 14 (corresponding to the restriction member) by bolts 16 (FIGS. 4 and 5). The first guide cylinder portion 9b of the slide spindle 9 is fitted on the inner diameter portion of the holding plate 14. An O-ring is provided on the inner diameter portion and the sliding portion of the slide spindle 9. The reverse surface 14a of the holding plate 14 is adapted to be in contact with (mounted on) the surface 9e of the step formed between the first inclined portion 9c and the first guide cylinder portion 9b. A thin rubber sheet 17 is held between the reverse surface 14a of the holding plate 14 and the step surface 9e.

An inclined surface 13c is formed inside the portion of the valve core metal 13 formed with the guide portions 13a. Below this portion, a first accommodation recess 13d making up a cylindrical space is formed. The first accommodation recess 13d has a circular first accommodation sectional area. This accommodation sectional area is the one with the first accommodation recess 13d cut in the direction perpendicular to the axis. The holding plate 14 is accommodated and mounted in the first accommodation recess 13d. Further below the first accommodation recess 13d, a second accommodation recess 13e is formed. The second accommodation recess 13e is formed with a space large enough to accommodate the first inclined portion 9c of the slide spindle 9. The second accommodation recess 13e has a deformed second accommodation sectional area corresponding to the shape of the slide spindle 9 (FIG. 6). This accommodation sectional area is smaller than the first accommodation sectional area of the first accommodation recess 13d. As a result, a step is formed in the boundary between the first accommodation recess 13d and the second accommodation recess 13e, and the holding plate 14 is fastened on the surface of this step. Since the holding plate 14 is mounted with the first accommodation recess 13d formed, the holding plate 14 can be mounted at a lower height. As a result, the height of the gate valve apparatus can be reduced.

A guide hole 13b is formed below the valve core metal 13. The guide hole 13b is fitted with and adapted to guide the second guide cylinder portion 9d of the slide spindle 9. The movable piece 12 is accommodated in the space above the guide hole 13b. The shape of the movable piece 12 is shown also in FIG. 7. The upper side of the slide spindle 9 is guided by the inner diameter portion of the holding plate 14, and the lower side of the slide spindle 9 is guided by the guide hole 13b. In this way, the slide spindle 9 can be moved vertically in stable fashion.

Assume that FIG. 7(b) is a front view, and FIG. 7(a) a left side view. The movable piece 12 can move in the direction perpendicular to (crossing) the direction of insertion. The movable piece 12 is formed with the second inclined portion 12a and the pressure portion 12b, as described above. The pressure surface of the pressure portion 12b has a surface in the shape of a cylinder corresponding to the shape of the inner wall surface of the water pipe K.

[Operation of Gate Valve Apparatus]

The process of steps before setting the gate valve will be explained for the gate valve apparatus according to the invention.

First, FIG. 1 shows the state in which a through hole is formed in the water pipe K and the gate valve apparatus is mounted. The state shown in FIG. 1 represents a setting immediately before inserting the gate valve body into the pipe. Under this condition, the lowest surface of the elastic seal member 15 and the forward end surface 8b of the valve rod 8 are located slightly outside of the virtual inner wall surface of the water pipe K. Specifically, the forward end surface 8b of the valve rod 8 is inserted into the through hole 15b preformed in the lowest surface of the elastic seal member 15. This setting can reduce the vertical height of the gate valve apparatus.

From the state of FIG. 1, the valve rod 8 is rotationally driven. The threaded piece 11 gradually moves down along the valve rod 8 (along the direction Y of insertion). Thus, the gate valve body moves gradually downward. The gate valve body is smoothly guided downward by a guide mechanism (the guide protrusion 3a and the guide portions 13a).

FIG. 2 shows the gate valve body inserted in the pipe. The elastic seal member 15 is a set width H slightly smaller than the inner diameter D1 of the water pipe K. The gate valve body including the elastic seal member 15 can thus be inserted into the pipe smoothly. Due to the dimensional relations described above, a space S is formed between the outer surface of the elastic seal member 15 and the inner wall of the water pipe when the gate valve body is inserted into the pipe (FIGS. 2 and 3). To stop water supply, therefore, this space is required to be eliminated.

The subsequent operation will be explained in detail with reference to FIGS. 3 and 4. FIGS. 3 and 4 show the state before the right half portion is completely inserted into the pipe and the state after the left half portion is completely inserted into the pipe. As shown in FIG. 3, a space S is formed in horizontal direction between the outer surface of the elastic seal member 15 and the inner wall surface of the water pipe K. A small space T is also formed between the lower surface of the elastic seal member 15 and the inner wall surface of the water pipe.

With further rotation of the valve rod 8, the elastic seal member 15 also slightly moves down, so that the lower surface of the elastic seal member 15 is closely attached with the inner wall surface of the water pipe. However, the rotation of the valve rod 8 causes the threaded piece 11 to move down further, thereby making it possible to move the slide spindle 9 still further downward. As a result, the first inclined portion 9c of the slide spindle 9 presses the second inclined portion 12a of the movable piece 12, and thus tends to move the movable piece 12 horizontally (in the direction crossing the direction of insertion). Under this condition, a gap is formed between the reverse surface side of the holding plate 14 and the step surface 9e of the slide spindle 9.

The horizontal movement of the movable piece 12 causes the pressure portion 12b to elastically deform the elastic seal member 15. As a result, the space S in the horizontal direction disappears, so that the elastic seal member 15 is closely attached on the inner wall surface of the pipe, thus stopping water supply. At the same time, the second guide cylinder portion 9d of the slide spindle 9 is moved down and inserted into the through hole 15b (left half of FIG. 3).

The operation of releasing the gate valve body out of the pipe will be explained. The process for releasing the gate valve body out of the pipe is reverse to the process described above. First, the valve rod 8 is rotated in reverse direction. The threaded piece 11 moves up. The slide spindle 9 is also moved up in operatively interlocked relation. Thus, the first inclined portion 9c moves up. In operatively interlocked relation with the upward movement of the first inclined portion 9c, the movable piece 12 tends to return to the original position by the elastic restitutive force of the elastic seal member 15 (right half of FIG. 3). After the slide spindle 9 moves up and the step surface 9e and the reverse surface of the holding plate 14 come into contact with each other, the whole gate valve body begins to move up. The state of FIG. 1 thus is restored.

To facilitate the understanding of the advantages of the gate valve apparatus according to the invention, the gate valve apparatus having the conventional structure is shown in FIG. 8. In FIG. 8, the members having the same functions as those in FIG. 1 are designated by the same reference numerals, respectively.

In FIG. 8, no through hole is formed in the lowest surface of the elastic seal member 15. Immediately before the gate valve body is inserted in the pipe, therefore, the forward end surface 8b of the valve rod 8 is located at a considerably higher position as compared with the configuration shown in FIG. 1. As a result, the height E from the center of the water pipe to the threaded piece is greater for the conventional structure. According to this invention, the height E can be reduced by forming a through hole in the lowest surface of the elastic seal member 15. Thus, the vertical height of the gate valve apparatus can be reduced. The slide spindle 9 is guided by the holding plate 14 and the guide hole 13b, and therefore a stable guide operation can be realized with a reduced height E.

[Other Embodiments]

(1) The gate valve apparatus according to the invention can be used for gas pipes, etc. as well as for the water pipe.

(2) The direction in which the movable piece moves is not necessarily horizontal. The movable piece may be movable not strictly horizontally as long as the space in the direction crossing the direction of insertion can be hermetically sealed. In other words, the movable piece may move in any direction crossing the direction of insertion.

(3) As shown in FIG. 6, according to this embodiment, the slide spindle 9 is configured of a single component part including the first guide cylinder 9b and the first inclined portion 9c integrally formed with each other. Nevertheless, these parts may be formed separately and coupled with each other to make up the slide spindle 9.

What is claimed is:

1. A gate valve apparatus comprising:
an elastic seal member inserted into a pipe by way of a through hole formed in the peripheral wall of the pipe;
a pressure member for elastically deforming, under the pressure imparted along the direction of insertion, the elastic seal member inserted into the pipe;
a drive shaft formed as a rod along the direction of insertion to move the pressure member along the direction of insertion;
a movable member for keeping the elastic seal member in pressure contact with the inner wall surface of the pipe in the direction crossing the direction of insertion; and
a support member for supporting the elastic seal member;
wherein the elastic seal member is elastically deformed and kept in close contact with the inner wall surface of the pipe thereby to gate the flow path in the pipe,
the pressure member includes a first inclined portion for changing the direction of pressure and a guide cylinder portion formed at a position nearer to the forward end along the direction of insertion than the first inclined portion,
the movable member has a second inclined portion for receiving the pressure from the first inclined portion, and
the support member has a guide hole fitted with the guide cylinder portion;
wherein the elastic seal member includes a through hole which is formed nearer to the forward end along the direction of insertion than the guide hole and by way of which the forward end portion of the drive shaft can be inserted; and
wherein the pressure member moves along the direction of insertion and thereby causes the elastic seal member to come into pressure contact with the inner wall surface of the pipe under the effect of the first inclined portion and the second inclined portion.

2. A gate valve apparatus according to claim 1, characterized in that the forward end portion of the drive shaft is set in the state inserted into the through hole immediately before the elastic seal member is inserted into the pipe.

3. A gate valve apparatus according to claim 1, characterized in that the pressure member is such that the outer diameter of the first inclined portion has a protrudent shape and has a substantially trapezoidal section in the shape of a wing.

4. A gate valve apparatus according to claim 1, characterized in that the first inclined portion and the guide cylinder portion are formed integrally with each other.

5. A gate valve apparatus according to claim 1, characterized in that the support member is formed with a first accommodation recess having a first accommodation sectional area and a second accommodation recess having a second accommodation sectional area smaller than the first accommodation sectional area, the first accommodation recess being formed above the second accommodation recess, the second accommodation recess functioning as an accommodation space for accommodating the first inclined portion of the pressure member, the first accommodation recess functioning as an accommodation space for accommodating a restriction member for limiting the upward movement of the first inclined portion, the restriction member being mounted on the surface of a step formed in the boundary between the first accommodation recess and the second accommodation recess.

6. A gate valve apparatus according to claim 2, characterized in that the first inclined portion and the guide cylinder portion are formed integrally with each other,
the support member is formed with a first accommodation recess having a first accommodation sectional area and a second accommodation recess having a second accommodation sectional area smaller than the first accommodation sectional area, the first accommodation recess being formed above the second accommodation recess, the second accommodation recess functioning as an accommodation space for accommodating the first inclined portion of the pressure member, the first accommodation recess functioning as an accommodation space for accommodating a restriction member for limiting the upward movement of the first inclined portion, the restriction member being mounted on the surface of a step formed in the boundary between the first accommodation recess and the second accommodation recess.

7. A gate valve apparatus according to claim 1, characterized in that the interior of the pressure member is formed with a through hole by way of which the drive shaft can be inserted.

* * * * *